United States Patent
Bell et al.

(10) Patent No.: US 7,319,232 B1
(45) Date of Patent: Jan. 15, 2008

(54) APPARATUS AND METHOD FOR HIGH-BANDWIDTH OPTO-COUPLER INTERFACE

(75) Inventors: Robert Bell, Chandler, AZ (US); Brad Benson, Chandler, AZ (US); Patrice R. Lethellier, Chandler, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 166 days.

(21) Appl. No.: 11/146,667

(22) Filed: Jun. 6, 2005

(51) Int. Cl.
*G02B 27/00* (2006.01)

(52) U.S. Cl. .............. 250/551; 250/214 R; 327/514

(58) Field of Classification Search ............ 250/551, 250/214 R; 327/514; 363/21.07, 21.1, 21.15, 363/21.18
See application file for complete search history.

(56) References Cited

U.S. PATENT DOCUMENTS

| | | | | |
|---|---|---|---|---|
| 5,276,359 | A | * | 1/1994 | Chiang ................. 327/514 |
| 5,949,085 | A | * | 9/1999 | Barrett ................. 250/551 |
| 6,349,045 | B1 | * | 2/2002 | Kogel et al. ........... 363/20 |

OTHER PUBLICATIONS

Radek Nalepa et al., Primary Side Control Circuit of a Flyback Converter, 2001 IEEE, pp. 542-547.
Mahmoud P. Sayani et al., Isolated Feedback for Off-Line Switching Power Supplies with Primary-Side Control, 1988 IEEE, pp. 203-211.
Daniel Victor Camin et al., Differential Optocoupler Amplifier with Low Noise, Low Power and Balanced Output, 2000 IEEE, pp. 2039-2044.

* cited by examiner

*Primary Examiner*—Kevin Pyo
(74) *Attorney, Agent, or Firm*—Darby & Darby P.C.; Matthew M. Gaffney

(57) ABSTRACT

An opto-coupler interface is provided. The opto-coupler interface includes a current mirror and a resistor. The opto-coupler interface is arranged such that a relatively fixed voltage is provided across the photodetector. At one end of the photodetector, the voltage is relatively fixed because the photodetector is coupled to the input of a current mirror. Because the voltage across the opto-coupler is relative fixed, the opto-coupler interface is a current interface rather than a voltage interface. Current from the photodetector is mirrored by the current mirror to provide an output mirror current. The output mirror current is provided to a resistor such that the resistor provides a voltage that is based on the output mirror current.

12 Claims, 3 Drawing Sheets

//1//

APPARATUS AND METHOD FOR HIGH-BANDWIDTH OPTO-COUPLER INTERFACE

FIELD OF THE INVENTION

The invention is related to opto-couplers, and in particular, to an apparatus and method for an opto-coupler interface in which the photodetector current is provided to a current mirror.

BACKGROUND OF THE INVENTION

Certain applications may require galvanic isolation. For example, for safety reasons, AC-to-DC switch-mode power supplies typically require galvanic isolation between the AC line voltage and the outputs of the power supply. For the feedback path of the switch-mode power supply, galvanic isolation is typically accomplished by employing an opto-coupler in the signal path. Additionally, opto-couplers may be used for galvanic isolation in applications other than switch-mode power supplies.

An opto-coupler typically includes a light-emitting diode (LED) and a photodetector. A signal may be transmitted optically from the light-emitting diode to the photodetector. The light-emitting diode provides an optical signal (e.g. visible or infrared light) which, in turn, is received by the photodetector.

BRIEF DESCRIPTION OF THE DRAWINGS

Non-limiting and non-exhaustive embodiments of the present invention are described with reference to the following drawings, in which.

DETAILED DESCRIPTION

Figure 1:
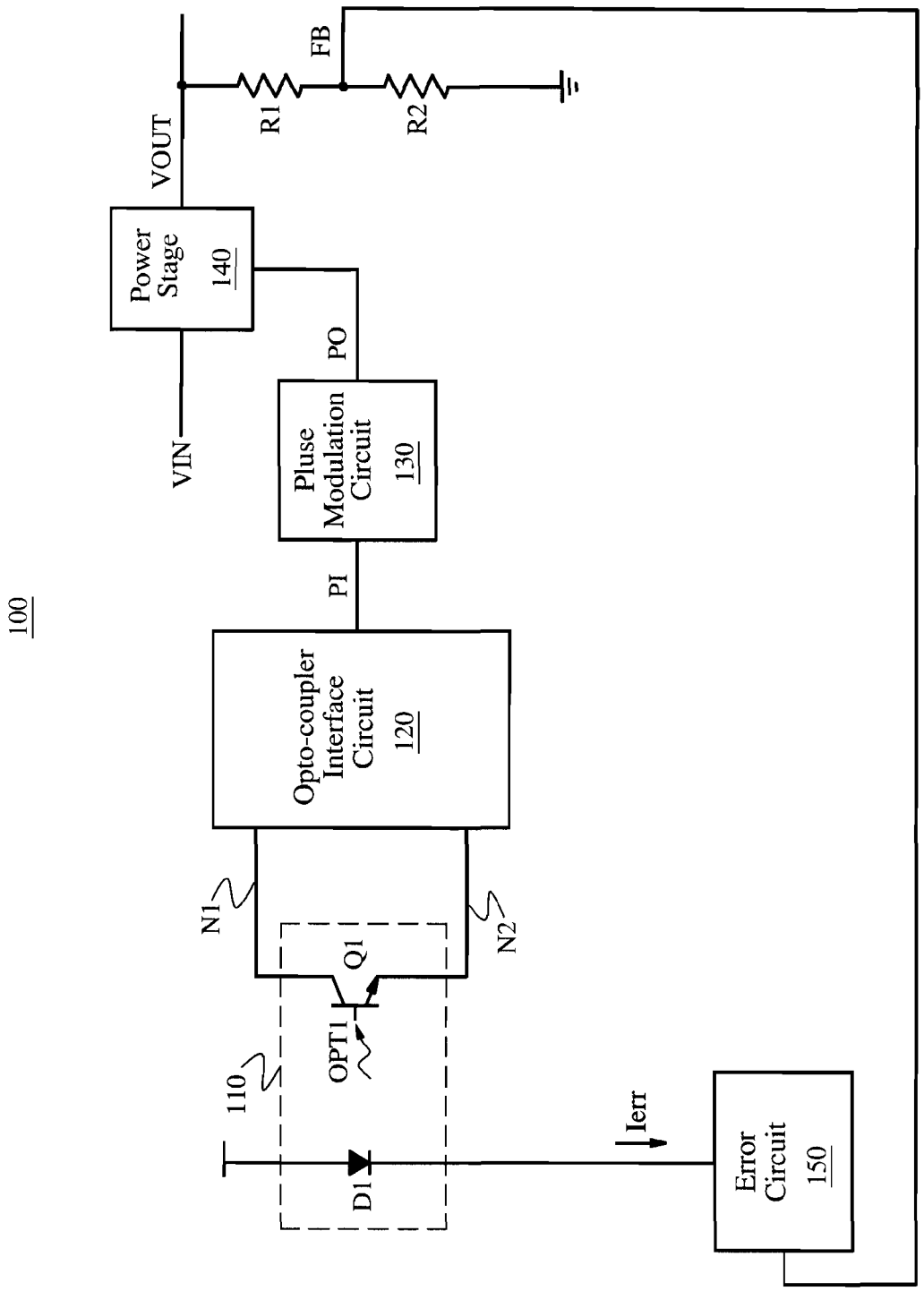
FIG. 1 illustrates a block diagram of an embodiment of a power supply.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to an opto-coupler interface that includes a current mirror and a resistor. The opto-coupler interface is arranged such that a relatively fixed voltage is provided across the photodetector. At one end of the photodetector, the voltage is relatively fixed because the photodetector is coupled to the input of a current mirror. Because the voltage across the opto-coupler is relatively fixed, the opto-coupler interface is a current interface rather than a voltage interface. Current from the photodetector is mirrored by the current mirror to provide an output mirror current. The output mirror current is provided to a resistor such that the resistor provides a voltage that is based on the output mirror current.

FIG. 1 illustrates a block diagram of an embodiment of power supply 100. Power supply 100 may include opto-coupler interface circuit 120, pulse modulation circuit 130, power stage 140, resistors R1 and R2, error circuit 150, and opto-coupler 110. Opto-coupler 110 includes LED D1 and photodetector Q1.

In operation, power stage 140 provides output voltage VOUT from input voltage VIN, based in part on pulse modulation output signal PO.

In one embodiment, voltage divided R1/R2 provides feedback signal FB from output voltage VOUT. Although FIG. 1 illustrates an embodiment of voltage-mode regulation in which signal FB is a feedback voltage that is provided based on output voltage VOUT, in another embodiment, current-mode regulation may be employed in addition to or instead of the voltage-mode regulation.

Error circuit 150 may be arranged to provide error current Ierr based, in part, on feedback signal FB. In one embodiment, current Ierr is substantially proportional to a difference between feedback voltage FB and a reference voltage VREF (not shown).

LED D1 may be arranged to provide optical signal OPT1 based, in part, on error current Ierr. Additionally, photodetector Q1 is arranged to receive optical signal OPT1 at a base of photodetector Q1.

Opto-coupler interface circuit 120 is coupled to photodetector Q1 at node N1 and node N2. Opto-coupler interface circuit 120 is arranged to provide a fixed voltage drop across photodetector Q1 (between nodes N1 and N2) so that the interface is essentially a current interface. Further, opto-coupler interface circuit 120 is arranged to receive a photodetector output current (not shown in FIG. 1), which is provided (by opto-coupler 110) at either node N1 or node N2. In one embodiment, opto-coupler interface circuit 120 is further arranged to provide a first voltage (not shown in FIG. 1) that is based, in part, on the photodetector output current. In this embodiment, pulse modulation input signal PI is based, at least in part, on the first voltage.

Pulse modulation circuit 130 is arranged to provide pulse modulation output signal PO such that pulse modulation output signal PO is modulated based on pulse modulation input signal PI.

Figure 2:
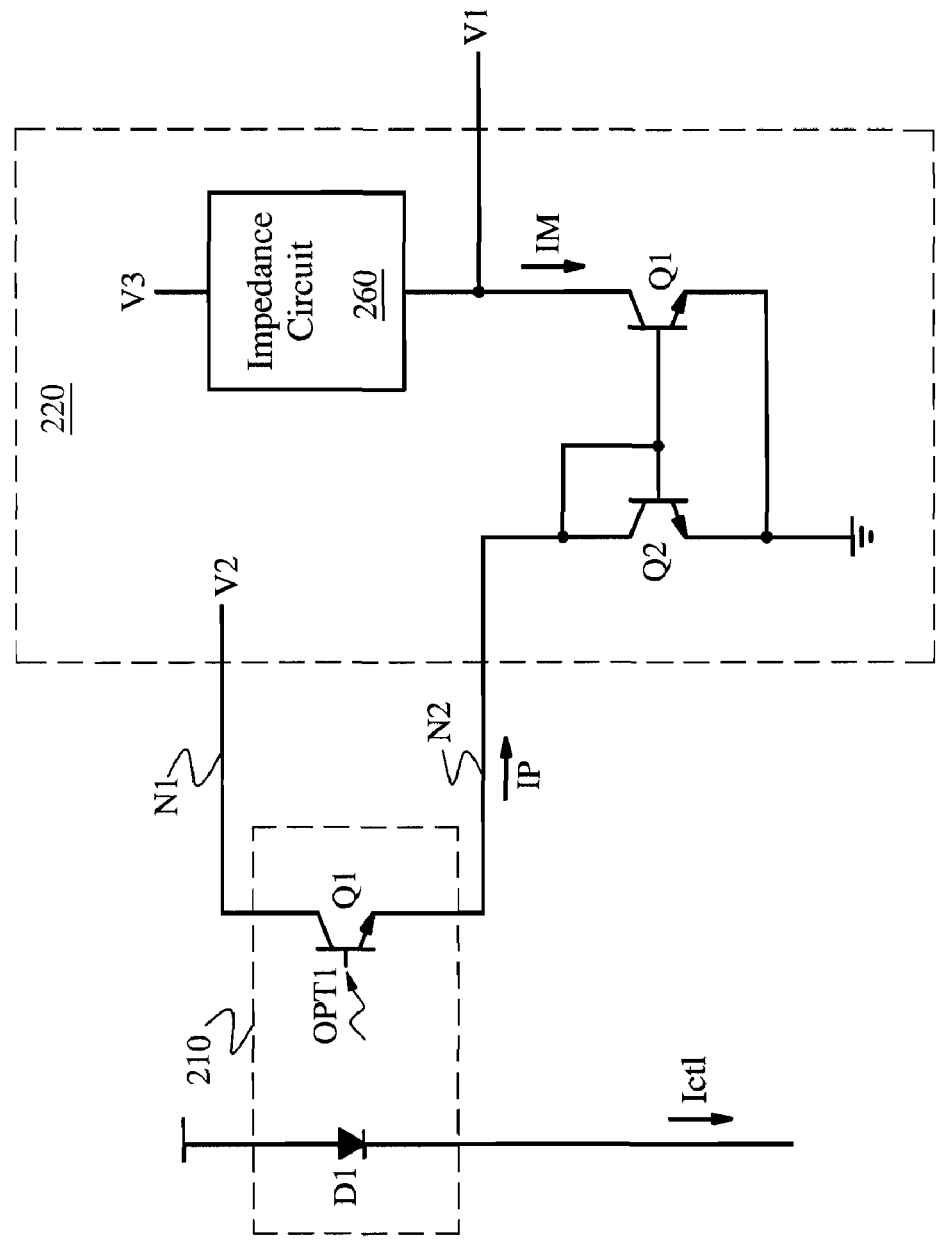
FIG. 2 shows a block diagram of an embodiment of an opto-coupler and an opto-coupler interface.

FIG. 2 shows a block diagram of an embodiment of opto-coupler 210 and opto-coupler interface 220. An embodiment of opto-coupler 210 and opto-coupler interface 220 may be employed in an embodiment of power supply 100 of FIG. 1. However, the invention is not limited to power supplies, and embodiments of opto-coupler interface 220 may be employed in virtually any application in which an opto-coupler is used. Opto-coupler interface 220 may include impedance circuit 260, and a current mirror including transistors Q2 and Q3. Although FIG. 2 shows transistors Q2 and Q3 as n-type transistors with emitters coupled to ground, in other embodiments, transistors Q1 and Q2 may be p-type transistors with emitters coupled to VDD, and/or the like.

In operation, opto-coupler interface 220 provides voltage V2 at node N1 such that voltage V2 is a relatively fixed voltage. Voltage V2 may be a reference voltage, VDD, ground, and/or the like. Also, because transistor Q2 is arranged in a diode configuration, node N2 is held at a relatively fixed voltage (e.g. the base-emitter voltage of transistor Q2).

Current mirror Q2/Q3 is arranged to receive photodetector output current IP and to provide output mirror current IM. In one embodiment, current mirror Q2/Q3 is a 1:1 current mirror such that current IM is substantially equal to current IP. In other embodiments, current mirror Q2/Q3 may have a ratio other than 1:1 to provide current gain.

In one embodiment, impedance circuit 260 is arranged to provide first voltage V1 responsive to current IM. Impedance circuit 260 may be coupled to voltage V3. In one embodiment, voltage V3 is voltage V2. In another embodiment, voltage V2 and voltage V3 are separate voltages.

If opto-coupler 210 is used in a power supply, control current Ictl may be an error current. However, opto-coupler 210 may be used in other applications, so that control current Ictl may represent any current that is received by LED D1.

Although one embodiment of opto-coupler interface 220 is illustrated in FIG. 2 for illustrative purposes, various other embodiment of opto-coupler interface 220 are within the scope and spirit of the invention. For example, although BJTs are illustrated in FIG. 2, in other embodiments, one or more of the BJTs may be replaced with a different type of transistor, such as a FET, or the like. Also, as previously discussed, in another embodiment, the circuit may be turned "upside down" so that transistor Q2 and Q3 are p-type transistors rather than n-type transistors. Additionally, if a current output is desired rather than a voltage output, impedance circuit 260 may be excluded from opto-coupler interface 220. These embodiments and others are within the scope and spirit of the invention.

Figure 3:
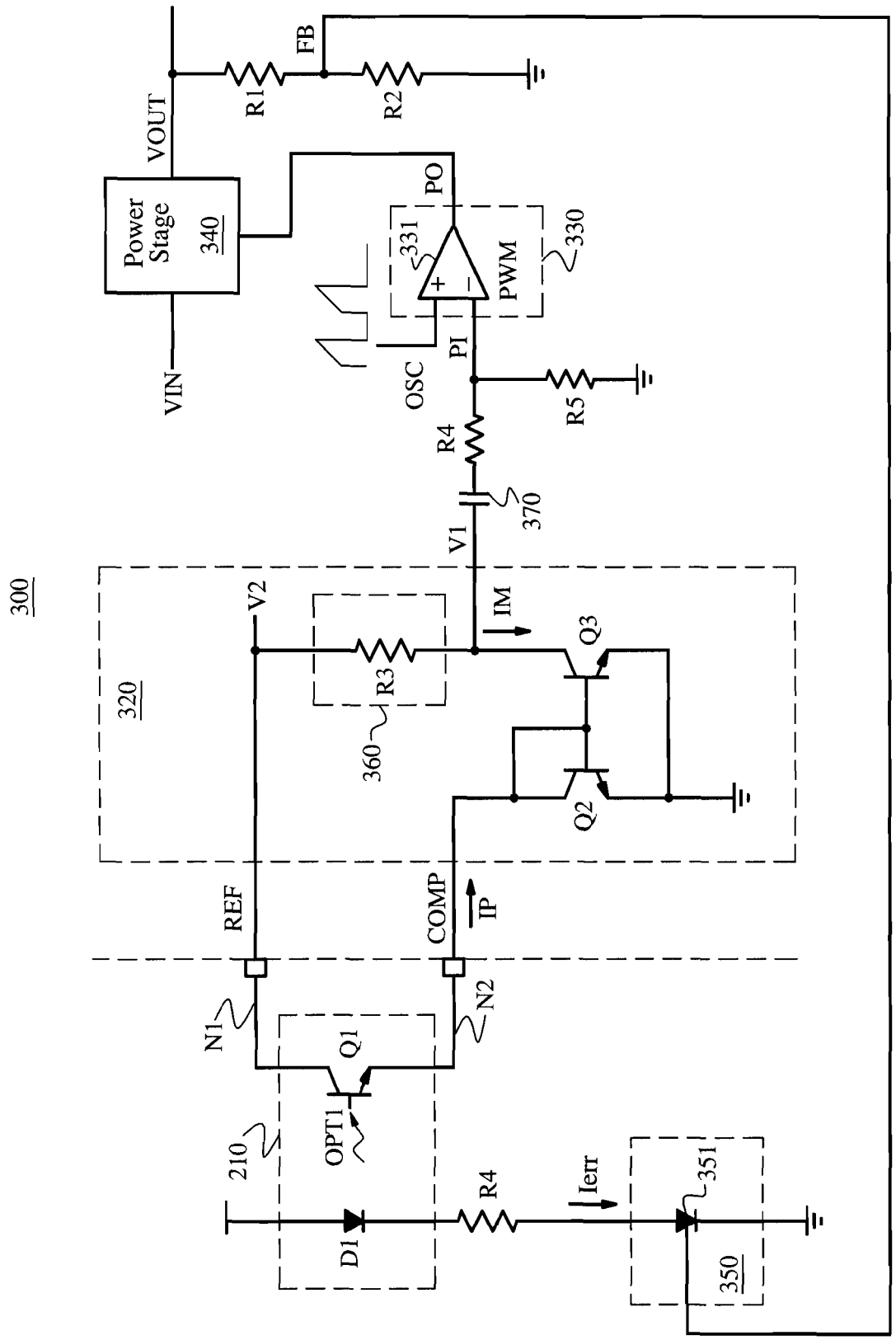
FIG. 3 illustrates a block diagram of an embodiment of the power supply of FIG. 1, arranged in accordance with aspects of the present invention.

FIG. 3 illustrates a block diagram of an embodiment of power supply 300, which may be employed as an embodiment of power supply 100 of FIG. 1. Also, opto-coupler interface 320 includes an embodiment of opto-coupler interface 220 of FIG. 2. Impedance circuit 360 includes resistor R3. Pulse modulation circuit 330 includes pulse width modulation (PWM) comparator 331. Error circuit 350 includes shunt regulator 351. Power supply 300 further includes voltage source 370, resistor R4-R5, a REF pin at node N1, and a COMP pin at node N2.

In operation, shunt regulator 350 provides error current Ierr based on a difference between feedback voltage FB and a reference voltage. In one embodiment, the reference voltage is 2.5V, and resistors R1 and R2 are substantially equal, so that output voltage VOUT is regulated to about 5.0V. In other embodiments, different sets of values may be employed.

In the embodiment illustrated in FIG. 3, resistor R3 is arranged to provide voltage V1 such that voltage V1 may be substantially given by V2−(IM*R3). In one embodiment, resistor R3 is about 5 kiloOhms.

PWM comparator 331 is arranged to provide signal PO such that the pulse width of signal PO is modulated based on signal PI. Also, the polarity of PWM comparator 331 is such that zero current into pin COMP produces a maximum duty cycle at the gate driver output.

Power supply 300 has a relatively high bandwidth since the limiting pole normally associated with the opto-coupler interface is at a relatively high frequency. The bandwidth-limiting effect normally encountered from the significant capacitance of the opto-coupler is substantially negated. The capacitance at the collector of transistor Q3 is much less than the capacitance at the emitter of photodetector Q1.

In one embodiment, opto-coupler interface 320 is arranged to provide voltage V2 such that voltage V2 is a reference voltage of about 5V that is provided to pin REF. In other embodiments, a different voltage level may be provided at pin REF. Pin COMP is coupled to the emitter of photodetector Q1 to receive photodetector output current IP.

Although one embodiment of power supply 300 is illustrated in FIG. 3 for illustrative purposes, various other embodimenst of power supply 300 are within the scope and spirit of the invention. For example, although BJTs are illustrated in FIG. 3, in other embodiments, one or more of the BJTs may be replaced with a different type of transistor, such as a FET, or the like. Also, as previously discussed, in one embodiment, the circuit may be turned "upside down" so that transistor Q2 and Q3 are p-type transistors rather than n-type transistors, and voltage V2 is ground. Additionally, if a current output is desired rather than a voltage output, resistor R3 may be excluded from opto-coupler interface 220.

Further, although in one embodiment shunt regulator 351 is employed to provide an error current to LED D1, in other embodiments, a different type of error circuitry may be employed for providing error current Ierr. Similarly, although an embodiment of circuitry for providing output voltage VOUT from voltage V1 is illustrated in FIG. 3 for illustrative purposes, in other embodiments, different circuitry for providing output voltage VOUT from voltage V1 may be employed. Further, as previously discussed, although a power supply circuit is discussed herein for illustrative purposes, the invention is not so limited. Opto-coupler interface 320 may be employed in virtually in application in which an opto-coupler is employed. These embodiments and others are within the scope and spirit of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for an opto-coupler interface, comprising:
 an opto-coupler, including:
  a light-emitting diode that is arranged to receive a control current, wherein the light-emitting diode is further arranged to provide an optical signal based on the control current; and
  a photodetector that is arranged to provide a photodetector output current responsive to the optical signal;

a current mirror circuit that is coupled to the photodetector, wherein the current mirror circuit is arranged to provide a mirror output current based on the photodetector output current; and an error circuit that is arranged to provide the control current based, in part, on a difference between a feedback signal and a reference signal.

2. The circuit of claim 1, further comprising:
an impedance circuit that is arranged to provide a first voltage from the mirror output current.

3. The circuit of claim 2, wherein the impedance circuit is a resistor.

4. The circuit of claim 1, further including an impedance circuit that is coupled to a node, wherein the opto-coupler interface is arranged to provide a fixed voltage at a reference pin, the current mirror circuit has at least an input that is coupled to a comp pin and an output that is connected to the node, and wherein the photodetector is coupled between the reference pin and the comp pin.

5. A circuit for an opto-coupler interface, comprising:
an opto-coupler, including:
a light-emitting diode that is arranged to receive a control current, wherein the light-emitting diode is further arranged to provide an optical signal based on the control current; and
a photodetector that is arranged to provide a photodetector output current responsive to the optical signal;
a current mirror circuit that is coupled to the photodetector, wherein the current mirror circuit is arranged to provide a mirror output current based on the photodetector output current;
a pulse modulation circuit that is arranged to provide a pulse modulation output signal such a parameter of the pulse modulation output signal is modulated based on a pulse modulation input signal, wherein the pulse modulation input signal is based, in part, on the mirror output current; and
a power stage that is arranged to provide an output voltage based, in part, on the pulse modulation output signal, wherein the control current is based, in part, on the output voltage.

6. A circuit for an opto-coupler interface, comprising:
an opto-coupler, including:
a light-emitting diode that is arranged to receive a control current, wherein the light-emitting diode is further arranged to provide an optical signal based on the control current; and
a photodetector that is arranged to provide a photodetector output current responsive to the optical signal;
a current mirror circuit that is coupled to the photodetector, wherein the current mirror circuit is arranged to provide a mirror output current based on the photodetector output current;
an impedance circuit that is arranged to provide a first voltage from the mirror output current;
a pulse modulation circuit that is arranged to provide a pulse modulation output signal such a parameter of the pulse modulation output signal is modulated based on a pulse modulation input signal, wherein the pulse modulation input signal is based, in part, on the mirror output current; and
a power stage that is arranged to provide an output voltage based, in part, on the pulse modulation output signal, wherein the control current is based, in part, on the output voltage.

7. A circuit for an opto-coupler interface, comprising:
an opto-coupler, including:
a light-emitting diode that is arranged to receive a control current, wherein the light-emitting diode is further arranged to provide an optical signal based on the control current; and
a photodetector that is arranged to provide a photodetector output current responsive to the optical signal;
a current mirror circuit that is coupled to the photodetector, wherein the current mirror circuit is arranged to provide a mirror output current based on the photodetector output current; and
an impedance circuit that is coupled to a node, wherein the opto-coupler interface is arranged to provide a fixed voltage at a reference pin, the current mirror circuit has at least an input that is coupled to a comp pin and an output that is connected to the node, the photodetector is coupled between the reference pin and the comp pin, wherein the photodetector has at least a base, a collector, and an emitter; the base of the photodetector is arranged to receive the optical signal; the collector of the photodetector is coupled to the reference pin; and wherein the emitter of the photodetector is coupled to the comp pin.

8. A circuit for an opto-coupler interface that is arranged to interface with an opto-coupler, comprising:
a current mirror circuit that is arranged to receive a photodetector output current from the opto-coupler; and further arranged to provide a mirror output current that is based, at least in part, on the photodetector output current;
an impedance circuit that is arranged to provide a first voltage based, in part, on the mirror output current;
a pulse modulation circuit that is arranged to provide a pulse modulation output signal such a parameter of the pulse modulation output signal is modulated based on a pulse modulation input signal, wherein the pulse modulation input signal is based, in part, on the first voltage; and
a power stage that is arranged to provide an output voltage based, in part, on the pulse modulation output signal.

9. The circuit of claim 8, wherein the impedance circuit includes a resistor.

10. The circuit of claim 8, wherein the impedance circuit is coupled between a node and a reference pin, the opto-coupler interface is arranged to provide a fixed voltage at the reference pin, the current mirror circuit has at least an input that is coupled to a comp pin and an output that is connected to the node, and wherein the photodetector is coupled between the reference pin and the comp pin.

11. A method for interfacing an opto-coupler, comprising:
providing a relatively fixed voltage drop across a photodetector of the opto-coupler;
employing a current mirror circuit to:
receive a photodetector output current from the photodetector; and
provide an output mirror current that is based, in part, on the photodetector output current;
providing a first voltage from the mirror output current;
providing a pulse modulation input signal based, in part, on the first voltage;
performing pulse modulation to provide a pulse modulation output signal such that the pulse modulation output signal is modulated based, in part, on the pulse modulation input signal;
providing an output signal based, in part, on the pulse modulation output signal;

providing a feedback signal such that the feedback signal is based, in part, on the output signal;

providing an error current based, in part, on the feedback signal; and providing the feedback signal to a light-emitting diode of the opto-coupler, where the light-emitting diode provides an optical signal to the photodetector based, at least in part, on the error current.

12. The method of claim 11, wherein providing the relatively fixed voltage drop includes:

coupling the photodetector between a reference node and a comp node, wherein an input of the current mirror circuit is coupled to the comp node such that a voltage at the comp node is relatively fixed; and providing a relatively fixed voltage at the reference node.

* * * * *

UNITED STATES PATENT AND TRADEMARK OFFICE
CERTIFICATE OF CORRECTION

PATENT NO. : 7,319,232 B1  
APPLICATION NO. : 11/146667  
DATED : January 15, 2008  
INVENTOR(S) : Bell et al.

It is certified that error appears in the above-identified patent and that said Letters Patent is hereby corrected as shown below:

On the Title Page Item -56-, under "Other Publications", line 7, delete "relative" and insert -- relatively --, therefor.

On Sheet 1 of 3, in Fig. 1 (Block 130), line 1, delete "Pluse" and insert -- Pulse --, therefor.

In column 2, line 33, delete "divided" and insert -- divider --, therefor.

In column 3, line 59, delete "resistor" and insert -- resistors --, therefor.

In column 4, line 25, delete "embodimenst" and insert -- embodiments --, therefor.

Signed and Sealed this

Sixth Day of May, 2008

JON W. DUDAS  
*Director of the United States Patent and Trademark Office*